United States Patent
Reynders et al.

(10) Patent No.: US 12,389,335 B2
(45) Date of Patent: Aug. 12, 2025

(54) METHOD FOR TRANSMIT POWER MANAGEMENT ON A COMMUNICATION LINK

(71) Applicant: ST ENGINEERING IDIRECT (EUROPE) CY NV, Sint-Niklaas (BE)

(72) Inventors: Brecht Reynders, Mechelen (BE); Daniel Delaruelle, Sint-Niklaas (BE); Dirk Breynaert, Sint-Niklaas (BE); Philippe Delbeke, Wilrijk (BE); Dieter Duyck, Sint-Niklaas (BE)

(73) Assignee: ST ENGINEERING IDIRECT (EUROPE) CY NV, Sint-Niklaas (BE)

( * ) Notice: Subject to any disclaimer, the term of this patent is extended or adjusted under 35 U.S.C. 154(b) by 0 days.

(21) Appl. No.: 18/007,894

(22) PCT Filed: Jul. 4, 2022

(86) PCT No.: PCT/EP2022/068480
§ 371 (c)(1),
(2) Date: Dec. 2, 2022

(65) Prior Publication Data
US 2024/0007957 A1    Jan. 4, 2024

(30) Foreign Application Priority Data
Aug. 27, 2021  (EP) .................................. 21193578

(51) Int. Cl.
*H04W 52/36* (2009.01)
*H04L 25/02* (2006.01)
*H04W 52/14* (2009.01)

(52) U.S. Cl.
CPC ....... *H04W 52/146* (2013.01); *H04L 25/0226* (2013.01)

(58) Field of Classification Search
CPC ...... H04L 25/49; H04W 28/04; H04W 52/12; H04B 7/216; H04B 17/309; H04B 3/56;
(Continued)

(56) References Cited

U.S. PATENT DOCUMENTS 8,094,606 B1   1/2012   Foley et al.
9,413,425 B2   8/2016   Tang et al.
(Continued)

FOREIGN PATENT DOCUMENTS

EP    3190720 A1    7/2017

OTHER PUBLICATIONS

Extended EP Search Report from European Application No. 21193578.8, Feb. 14, 2022.
(Continued)

*Primary Examiner* — Tu X Nguyen
(74) *Attorney, Agent, or Firm* — Workman Nydegger (57) ABSTRACT

A method for adjusting transmit power of a terminal transmitter on a return link between the terminal transmitter and a receiver. The method includes: a) determining on a version of at least one data burst signal comprised in the receive signal, and a first metric is indicative of the amount of non-linear distortion with which the version of the at least one data burst signal is impaired; b) determining on at least a part of the receive signal a second metric indicative of at least one impairment other than the amount of non-linear distortion; c) determining an updated transmit power value for a next data burst signal to be sent from the first terminal transmitter, thereby taking into account the first and second metric.

20 Claims, 5 Drawing Sheets

(58) Field of Classification Search
CPC .... H04B 10/035; H04B 1/7085; H04B 15/00; H04B 7/0417; H04B 1/02; H04J 14/08; H04J 3/07; H03G 3/20; H03G 3/00; H03G 5/16; G04F 10/00; G04F 5/14; G04F 5/00; G04F 10/04; G04F 5/06; G04F 10/10

See application file for complete search history.

(56) References Cited

U.S. PATENT DOCUMENTS 10,658,982 B1 *  5/2020  Drees ..................... H04B 1/04
2021/0044311 A1   2/2021  Rousset et al.

OTHER PUBLICATIONS

Declaration of Non-Establishment of International Search Report with Insufficiency of Disclosure from PCT Application No. PCT/EP2022/068480, Oct. 24, 2022.

Maral et al., "Performance of Fully Variable Demand Assignment SS/TDMA Satellite Systems," 11th Communications Satellite Systems Conference, Mar. 17-20, 1986, pp. 159-167.

Dhuyvetters et al., "Machine Learning-Based Characterization of SNR in Digital Satellite Communication Links," 2021 15th European Conference on Antennas and Propagation, Mar. 22-26, 2021, 5 pages.

International Search Report and Written Opinion from corresponding PCT Application No. PCT/EP2022/068480, Oct. 24, 2022.

* cited by examiner

METHOD FOR TRANSMIT POWER MANAGEMENT ON A COMMUNICATION LINK

FIELD OF THE INVENTION

The present invention is generally related to the field of techniques for automatically controlling the transmit power in a digital communication system.

BACKGROUND OF THE INVENTION

Two-way communication services in general are considered, where there is a link from a hub or gateway or base station (shortly called a hub in the remainder of this description) to a terminal or user equipment (called a terminal in the remainder), called the forward (FWD) link, and a link from the terminal back to the hub, called the return (RTN) link. In case of multiple terminals per hub, this network is referred to as a star network; otherwise it is referred to as a point-to-point link. In the case of a point-to-point link, the hub can also be a low-cost or high-end terminal.

Figure 1:
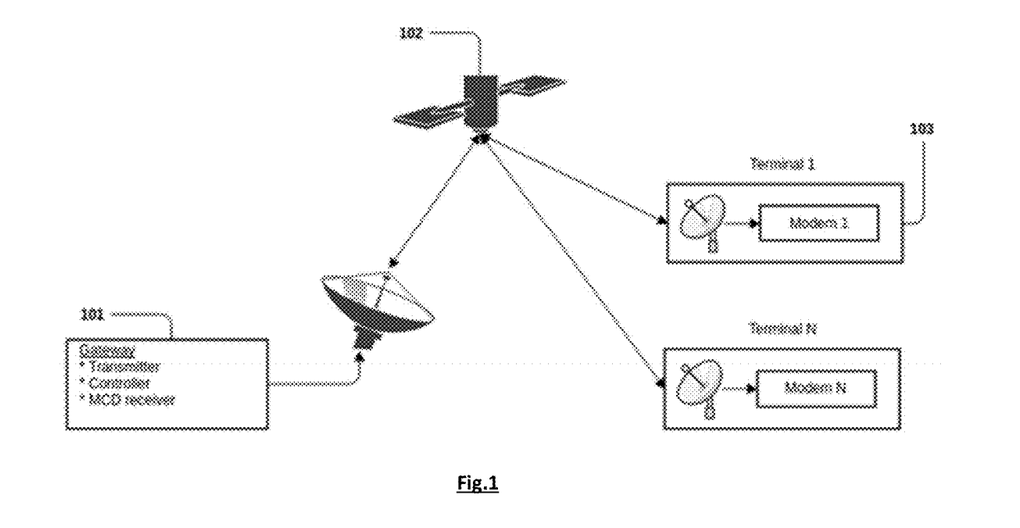
FIG. 1 illustrates a typical satellite star network.

A typical satellite two-way star network is illustrated in FIG. 1. A hub 101 communicates with a terminal 103 via a satellite 102. There are two main types of satellite: bent-pipe satellites and regenerative satellites. A bent-pipe or transparent satellite essentially operates as an amplifier forwarding the signal to increase coverage on earth. In such a system, multiple terminals may be covered through a single hub. A communication service may also contain several hubs. In the case of a regenerative satellite the signal is demodulated on-board the satellite. The hub receiver is then replaced by the (multi-carrier) demodulator(s) on-board the satellite. In the return link of such a star network where many terminal transmitters transmit to few hub receivers, the terminals share the communication link resources, meaning that the terminals must be organized to transmit orthogonal signals (i.e. signals not interfering in time or frequency or code). This is typically achieved by slaving all terminals to a common hub reference such as the network clock reference (NCR), which is a counter increasing at an internal clock rate synchronized with GPS time, cf. DVB-S2 Annex G.5.

Figure 2:
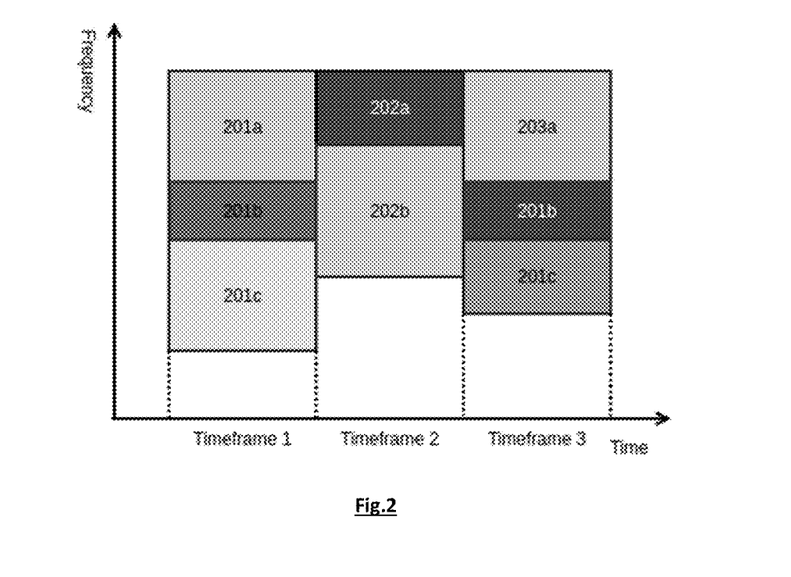
FIG. 2 illustrates a time-frequency diagram.

In a star network, terminals in the same communication network can share the available return spectrum of that communication network in a multiple frequency time division multiple access (MF-TDMA) framework. Each terminal is assigned a portion of time and frequency spectrum for transmission. This is typically visualized through a time-frequency diagram in the time-frequency plane. This is visualized in FIG. 2, where 201a-c denote transmissions occurring in timeframe 1, 202a-b transmissions in timeframe 2 and 203a-c transmissions in timeframe 3. Note that their bandwidths do not overlap and do not need to be identical in width.

The allocation of time and frequency slots, also referred to as resource allocation or scheduling, is performed in a central control unit. The central control unit is sometimes referred to as a controller or scheduler. The resource allocation is typically based on terminal capabilities (e.g. maximum power, maximum symbol rate), link quality (e.g. the signal-to-noise ratio or carrier-to-noise ratio (CN) associated with the carrier from each of the terminals, interference), terminal capacity requests (e.g. the payload size it wants to transmit over the next scheduling interval, e.g. the next 40 ms, where payload refers to data bits), total link capacity (total bandwidth available), service level agreements (some terminals may get priority over other terminals based on the contract with the service provider) and fairness (especially for the same priority class terminals). Indeed, the controller is arranged to manage the capacity so that a fair distribution of the available capacity can be obtained in congested cases where not all capacity requests can be fulfilled. There are numerous algorithms to perform this resource allocation in an efficient and performant way, see e.g. *"Performance of fully variable demand assignment SS-TDMA system"* (Maral and Bousquet, October 1987, Int'l Journal of Satellite Communications, pp. 279-290).

In order to have flexibility in assigning resources to a given terminal, terminals can be assigned to a different amount of time slots and frequency bins over time. The rules to assign time and frequency resources to terminals and the waveform definition mapped to this multiple access channel can be proprietary or standardized. One example of such a standard is Digital Video Broadcasting—Return Channel via Satellite (DVB-RCS and its second version, DVB-RCS2).

A 'burst' is a continuous-time carrier (hence, without guard time in between) from a particular terminal in the return link (from terminal to hub, potentially via a satellite). A burst contains known symbols (a preamble, pilot symbols) for synchronization and identification purposes, and data symbols or information symbols. In order to have an efficient transmission, i.e., with less guard time and less overhead (as there is only one preamble in a burst), longer bursts are of interest. A long burst can contain multiple forward error correcting (FEC) words, potentially thousands of FEC words.

In a return link the hub (in case of communication without satellite or with a transparent satellite) or on-board (in the case of regenerative satellites) demodulators demodulate and decode all carriers from all terminals in a communication network. The device (or devices) demodulating and decoding these carriers is (are) referred to as a multi-carrier demodulator (MCD).

The overall efficiency of the return link can be expressed as the number of useful bits transmitted over a frame divided by the product of the time duration of that frame (including the guard time) and the frequency bandwidth available for that communication network in the return link:

$$\text{efficiency} = \frac{\text{number of useful bits transmitted over a frame}}{\text{time duration of a frame} * \text{frequency bandwidth used}}$$

Alternatively, one could say the efficiency is the division of the number of useful bits over the area covered by the burst in the time-frequency plane. The efficiency can be improved by having terminals transmitting at a higher power to achieve a higher signal-to-noise ratio. So, for systems where the efficiency of transmission is maximized, there is a need for maximizing the power. Note that sometimes the battery life of a terminal not connected to the electricity grid is maximized in which case no maximization of the terminal transmission power is pursued.

Cost-effective terminals have a high power amplifier (HPA) with a limited power. While approaching the maximal power output, non-linear distortion appears in the signal due to the non-linear amplification close to the amplifier's saturation point. This non-linear distortion occurs more frequently in case of wide carriers. In case of narrower carriers, other limitations may be more applicable for example in terms of power spectral density. The non-linear distortion has a bandwidth larger than the normal signal's bandwidth, typically three times the normal signal's bandwidth. While approaching the saturation power, the power spectral density (PSD) of this non-linear distortion increases, which can result in unwanted interference to adjacent carriers. There is thus a clear need to avoid causing excessive distortion when optimizing a terminal's transmit power.

Transmit power optimization is typically achieved by manually calibrating a terminal high power amplifier, e.g. via a spectrum analyser or via measurements on a signal specifically dedicated for this purpose, also called "out-of-band" signalling, as these measurements are not performed on data a terminal has to transmit. For performing calibration an expert is needed and/or spectrum analyzer and/or time, see e.g. U.S. Pat. No. 9,413,425B2. This is clearly a costly process, even though costs may be minimized during fabrication. For out-of-band signalling, the process uses costly bandwidth, see e.g. U.S. Pat. No. 8,094,606. In addition, the calibration can become outdated when replacing equipment, e.g. a cable replacement. That is why many firms carry out a daily line-up, which requires even more out-of-band signalling, and which is also cumbersome. So, there is a need to have a simple and cost-effective (so, without human per-terminal intervention or expensive equipment and without using costly signal bandwidth) process to maximize a terminal's transmit power, while avoiding causing excessive distortion.

In addition, the distortion created while non-linearly amplifying a signal also interferes with the amplified signal itself. Depending on the modulation and coding used, a different non-linear distortion power can be allowed. By means of example, simplifying reality, QPSK modulations can deal with carrier-to-distortion ratios of around 18 dB while 64-APSK modulations can only deal with carrier-to-distortion ratios above 26 dB. The modulation and coding used, however, dynamically changes over time due to weather conditions and other phenomena. These changes require a transmit power adaptation such that the non-linear distortion power does not become dominant with respect to the thermal noise. In addition, a power calibration is typically made based on the highest modulation and coding, resulting in too much back-off for lower modulations and coding, losing dBs of power, significantly reducing the efficiency. So, there is a clear need for a simple, automatic and cost-effective process to maximize a terminal's transmit power without causing excessive distortion to its own signal or frequency adjacent signals, dynamically taking into account the instantaneous modulation and coding used to generate the signal.

In DVB-RCS2 power control is defined in section 9.9.1 of ETSI EN 301 545-2 V1.2.1 (2014 April). The terminal can signal power headroom to the NCC. This headroom is based on a maximum power configured in the terminal. As mentioned above, this is done through an expert or via out-of-band signalling. There is no mention in the DVB-RCS2 standard or guideline on how to manage this in closed loop in cost-effective way, without causing excessive distortion to the signal or to a frequency adjacent signal, dynamically taking into account the instantaneous modulation and coding. Similarly, in section 9.8 of ETSI EN 301 545-2 V1.2.1 (2014 April), ACM is used to keep the link margin as small as possible. However, this link margin is only adapted by altering modulation and coding and does not mention the power being adjusted.

Section 6.4.8 ETSI EN 301 545-2 V1.2.1 (2014 April) mentions a way to control the transmit power of a terminal in sections 6.4.8 or 6.4.17.1. These sections, however, do not contain details on how the transmit power changes should be implemented. Power allocation algorithms in different sections, such as constant EIRP and constant power spectral density, are described but are out of scope of the current invention as they only try to keep the power constant irrespective of the distortion. In section 9.9.1 of the same document there is a warning about excessive distortion to the signal when changing from one modulation order to the next, and it does not mention either how to choose the maximal power without causing excessive distortion.

Prior art documents on uplink power control (i.e. towards the satellite), e.g. U.S. Pat. No. 8,670,373, typically disclose a closed loop method that modifies the transmit power in an attempt to keep the rate equal, e.g. in the presence of fading (or any other changes in link conditions that modify the link signal-to-noise ratio (SNR)) in the communication link. To overcome the changes in link conditions, more terminal transmit power is requested so that the link signal-to-noise ratio (SNR) is kept as constant as possible. Crucial in this method is again a maximum power indication, as configured in the terminal or in the system. The determination of this maximum power is not elaborated upon and typically happens, as mentioned before, through an expert or by means of expensive equipment or regularly repeated dedicate measurement campaigns.

In terrestrial communication standards, such as 4G and 5G, often Orthogonal Frequency Division Multiplexing (OFDM) is used for transmission from one or more transmitters to a receiver. In OFDM, the peak-to-average power ratio (PAPR) is even higher than for single carrier transmission, such that more back-off needs to be taken at the terminal transmit amplifier to result in the same carrier to distortion ratio than for single carrier transmission. More back-off results in a lower average useful carrier power. When such OFDM modulation would be used over satellite, which is the case for 5G-NTN (non-terrestrial networks), the power transmitted from a terminal amplifier is even more the bottleneck limiting the throughput as the power of an OFDM waveform requires more back-off than the power from a single carrier transmission. In terrestrial networks, power is less scarce than in satellite networks, but it is obviously also of interest in terrestrial systems to optimize the transmit power. This can be used to allow for cheaper amplifiers or to achieve higher transmit powers.

In 5G-NR a mechanism based on terminal power headroom signalling is proposed. The power headroom is an indication of the excess power that the terminal can transmit before reaching saturation. The headroom value is signalled to the hub by the terminal. The hub can then check this headroom limit before asking terminal to raise a terminal transmit power and avoid saturation conditions. However, this headroom is not dynamically changed for higher modulations and codings. For more "advanced" terminals with an indoor and outdoor unit for instance, the headroom can change by changing cables for instance. So, if the headroom is wrong, the hub can cause the terminal to go into saturation or to stay far below saturation (resulting in a too low power output level).

The required headroom or back-off also depends on the modulation used. For instance, the table below shows the required back-off needed to have a carrier-to-distortion ratio (CD) of 25 dB for 64QAM amplified by a linearly clipped amplifier, when using single carrier transmission with 5% roll-off, 20% roll-off and OFDM. The main determining factor of this is the waveform PAPR.

|  | Waveform PAPR [dB] | Back-off required for 25 dB CD [dB] |
| --- | --- | --- |
| 64QAM 5% roll-off | 8.9 | 2.8 |
| 64QAM 20% roll-off | 7.9 | 2.5 |
| OFDM 64QAM | 11.6 | 4.9 |

Also for OFDM, lower modulation orders, e.g. 16-QAM, can bear a lower carrier-to-distortion ratio than higher modulation orders, e.g. 64-QAM. So, also for 5G-NR there is a need to have a simple and cost-effective (i.e., without human per-terminal intervention or expensive equipment and without using costly signal bandwidth) process to maximize a terminal's transmit power, while avoiding causing excessive distortion.

In EP3190720 A1 a satellite communication system is disclosed that provides loopback capability and increased throughput. The system utilizes pre-distortion based on remotely estimated characteristics of a satellite transponder's power amplifier. The predistortion is applied to the hub modulator's constellation.

In document US2021/044311 satellite transponder characteristics in terms of linear and/or non-linear distortions can be determined during a characterization phase. An adaptive precorrection technique is applied for compensating at least partially the distortions linked to the satellite transponder of a satellite transmission system. These characteristics are transmitted from a characterization receiver to the transmitter over a transmission link so that the transmitter can emit a useful, precorrected RF signal during an operating phase.

Hence, there is a need to overcome or at least mitigate the above-mentioned limitations and drawbacks.

SUMMARY OF THE INVENTION

It is an object of embodiments of the present invention to provide for a method for adjusting in a dynamical way the transmit power of a terminal transmitter on a return communication link, without negatively affecting the performance/transmission of other terminal transmitters of the system.

The above objective is accomplished by the solution according to the present invention.

In a first aspect the invention relates to a method for adjusting transmit power of a terminal transmitter of a communication system on a return link between the terminal transmitter and a receiver of the communication system, said terminal transmitter being one of a plurality of terminal transmitters of the communication system, wherein each terminal transmitter can send one or more data burst signals, said receiver receiving a receive signal being an aggregate of versions of the one or more data burst signals sent from the plurality of terminal transmitters. The method comprises:
 a) determining on a version of at least one data burst signal comprised in said receive signal, said at least one data burst signal sent from a first terminal transmitter of said plurality, a first metric indicative of the amount of non-linear distortion with which the version of the at least one data burst signal is impaired, said non-linear distortion resulting from a power amplifier in said first terminal transmitter,
 b) determining on at least a part of the receive signal a second metric indicative of at least one impairment other than the amount of non-linear distortion,
 c) determining an updated transmit power value for a next data burst signal to be sent from the first terminal transmitter, thereby taking into account the first and the second metric.

The proposed solution indeed allows for controlling the transmit power of a first terminal transmitter of the plurality of terminal transmitters of the communication system. The signal output by the transmitter amplifier in the first terminal transmitter is emitted via the transmitter antenna and then propagates over the return link to the receiver, possibly together with data burst signals from other terminal transmitters. The aggregation with data bursts from other terminal transmitters can for example happen at the satellite. The amplified signal from a terminal has spectral regrowth due to the non-linear behaviour of an amplifier. The spectral regrowth consists of frequency components outside the user signal with a lower power spectral density than the user signal's power spectral density. The regrowth power spectral density must be low enough to avoid disturbing the data burst signals from the other terminal transmitters. The received versions of one or more data burst signals present in the signal obtained in the receiver and coming from said first terminal transmitter are used to determine a first metric. The first metric is a distortion metric indicative of the non-linear distortion caused by that power amplifier in the first terminal transmitter. The distortion metric is calculated for example in the receiver where the signal was received or in the cloud. The distortion metric is conveyed to the transmitter so that it can be taken into account for determining an updated value of the transmit power for a next signal to be sent. Alternatively, the updated value of the transmit power may be directly conveyed to the transmitter after having been determined for example in the receiver. The second metric is indicative of at least one impairment different from the non-linear distortion. By combining information from the one metric indicative of non-linear distortion and the other metric indicative of at least one other type of impairment, one can then determine an updated transmit power value for a next data burst signal that will be sent from the terminal transmitter being considered.

The method of the invention offers an advantageous way to dynamically update the transmit power of the considered terminal transmitter of the communication system. This is in contrast to prior art solutions wherein the maximum transmit power is fixed in a static way, for example by calibration on site with a spectrum analyzer or after an analysis via pure carrier calibration. In the approach presented in this invention the amplifier saturation level is optimized not only in view of the carrier of the terminal transmitter being considered, but also in view of the carriers of the other transmitters of the plurality of transmitters in the communication system. The overall aim is to increase the signal-to-noise ratio of all terminals. This is realized by increasing the SNR for the terminal transmitter being considered (by increasing its transmit power) without negatively affecting the SNR of neighbouring channels (using adjacent carriers) because of the spectral regrowth caused by the transmitter under consideration.

In preferred embodiments at least the first metric indicative of the amount of non-linear distortion is determined on known symbols comprised in the version of the one data burst signal in the receive signal. The known symbols are in preferred embodiments part of a preamble of the frame. The known symbols in the preamble may advantageously have a same modulation order as payload data comprised in the at least one data burst signal.

In some embodiments the plurality of known symbols is part of a preamble of the at least one data burst signal. In other embodiments the plurality of known symbols is part of the DMRS symbols or SRS symbols of the at least one data burst signal.

In some embodiments the at least one data burst signal sent from said first terminal transmitter is modulated using single carrier transmission. In other embodiments the at least one data burst signal sent from said first terminal transmitter is modulated using OFDM. Preferably this is done in accordance with the 5G-NR standard.

The number of known symbols in the frame is in some embodiments increased occasionally, for example with a given periodicity (e.g. every second) or based on the occurrence of an event (e.g. a configuration change, a change in the weather conditions, . . . ). The receiver can then determine the first metric periodically or event-based, taking advantage of larger number of known symbols in the frame.

In some embodiments the method for adjusting transmit power comprises a step of predicting an updated value of the first metric when the updated transmit power value is determined. For said predicting a model of a high power amplifier of the first terminal transmitter is used in some embodiments. The model may be derived from observed distortion metrics.

In preferred embodiments the first metric is indicative of a carrier-to-distortion power ratio. The second metric may then for example be the carrier-to-noise power ratio or the carrier-to-noise and distortion ratio. In one embodiment the non-linear distortion power is measured by means of a detector assuming a predetermined amplifier non-linear characteristic.

In some embodiments of the method for adjusting transmit power, a higher transmit power value is selected for the next data burst signal in step c) if the second metric differs from the first metric with a predetermined amount.

In a preferred embodiment a higher transmit power value is selected for the next signal in step c) if the carrier-to-distortion ratio exceeds a carrier-to-noise ratio with a predetermined amount. The predetermined amount may in some embodiments be at least 7 dB or at least 10 dB or at least 12 dB.

In one embodiment the method comprises a step of predicting an updated value of the first metric when an update of the transmit power value is determined in step c). For said predicting a model may be used of one or more high power amplifiers of the at least one transmitter and/or the at least one receiver.

In some embodiments the second metric is indicative of thermal noise.

Advantageously, the transmit power is an uplink transmit power of a terminal in a satellite communication network.

In some embodiments at least steps a) and c) are performed for at least one other terminal transmitter of that plurality. In some embodiments that may be done for all terminal transmitters of the plurality.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

Some definitions of terms employed in this description are first given.

A hub is a gateway between the access network of terminals, for example a satellite or wireless access network, and the core network (also known as the Internet). The hub side of the access network is typically more expensive with better equipment, such as more expensive power amplifiers having sufficient power to be operative in the linear region (resulting in less non-linear distortion) and better link quality with the satellite.

A terminal is the remote end of the satellite or wireless access network that typically aggregates a small number of user equipments, e.g. computers and smart phones.

A communication link is to be construed as a wireless link with a feedback channel. Typically, both the wireless link and the feedback channel are wireless. In one embodiment the links are "over satellite", meaning that a satellite is part of the link between transmitter and receiver. In other embodiments the wireless link is a terrestrial link whereby a hub directly communicates with one or more terminals without a satellite in between. In this invention a digital communication system is considered comprising at least one receiver and a plurality of terminal transmitters. Each terminal transmitter is arranged to send data burst signals.

The term 'communication network' refers to all components combined, being hub, terminal, communication link and computers with the Internet. In some embodiments the communication network is a star network, whereas in other embodiments point-to-point connections are encountered.

The operation of a single transmitter from the plurality of terminal transmitters in a digital communication system as considered in this invention is now described. One can at the transmit side distinguish the processes of encoding and modulation, as is often the case in such systems. The information bits are first translated to a sequence of digital symbols (encoding) and subsequently the digital symbol sequence is translated to a continuous transmit waveform (modulation). The transmit waveform usually has a bandpass spectrum. It can then still be represented by an equivalent complex baseband transmit waveform having only low frequency components. The radio frequency waveform is obtained from the complex baseband waveform by quadrature modulation and possibly further frequency up-conversion. Before transmission over the air, the carrier waveform is amplified by the transmitter high power amplifier (HPA) to reach a configured or desired transmit power. Sometimes upconversion and amplification are combined in a single operation, e.g. by using frequency multiplier upconverters. The combination of upconversion and amplification is generally denoted block-up conversion (BUC). Possible non-linear characteristics of the high power amplification at the transmitter will be further elaborated on later in this description.

In so-called linear modulation schemes, the complex baseband waveform at the transmit side is obtained as the superposition of pulses of essentially finite duration, each pulse being the product of a complex-valued symbol with a delayed instance of a pulse known as the transmit filter impulse response. Alternatively, in terrestrial standards such as 4G and 5G multicarrier modulation like OFDM can be used. An OFDM modulated waveform can efficiently be generated via an IFFT operation (optionally preceded by other operations such as a DFT to decrease the peak-to-average power ratio (PAPR)). The finite set of complex-valued symbols is known as the constellation. A constellation is commonly represented as a set of M dots in a plane by interpreting the real and imaginary part of each of M symbol value as the abscissa and ordinate with respect to orthonormal axes. M is typically denoted as the modulation order. In a Phase Shift Keying (PSK) constellation all dots are located on a circle in the I-Q plane. In an Amplitude and Phase Shift Keying (APSK) constellation this restriction to a single circle is lifted. APSK in this sense includes double ring constellations as well as QAM constellations or any other form of constellation where amplitude and phase are in combination used to map data to symbols.

In some embodiments of the invention the transmitters of the digital communication system use binary encoding. In that case the encoder in a transmitter in general does not directly map the message bits to symbols. Rather it maps the message bits to coded bits. Subsequently a group of code bits is used to designate a transmit symbol. The latter operation is commonly called bit mapping and the group of $\log_2 M$ code bits designating a transmit symbol from an M-ary constellation is called a bit label. This process is usually mirrored at the receiver side by bit demapping, followed by binary decoding, as explained further. An interleaver may further reorder code bits prior to mapping in order to improve overall system performance. A person skilled in the art of digital communications will readily understand that the encoder, interleaver and mapper may at different times employ different code rules, interleaving rules and constellations. The combination of a particular modulation (employing a constellation on which the coded bits are mapped) and coding (referring to the binary encoding) is denoted a modcod.

A person skilled in the art of digital communications readily understands that the used modcod may be varied. This technique is commonly known as adaptive coding and modulation (ACM). See for example ETSI EN 302 307 v1.2.1: *Second generation framing structure, channel coding and modulation systems for Broadcasting, Interactive Services, News Gathering and other broadband satellite applications*. The present invention is applicable to any digital communication system or scheme using ACM to transmit information all the time or only a fraction of the time. For example, the present invention also applies to any form of multi-carrier or OFDM transmission such as 4G or 5G. A person skilled in the art of digital communications readily understands that in addition a priori known symbols or partially a priori known symbols may be inserted for the purpose of assisting receiver synchronisation, such as the start of physical layer frame (SOF) in DVB-S2(X), Demodulation Reference Signal (DMRS) or Sounding Reference Signals (SRS) symbols in 5G. When a priori known symbols are inserted before the symbols mapped from the coded bits, as is the case for instance with the SOF in DVB-S2(X), the a priori known symbols are referred to as a preamble. When a priori known symbols are inserted in between the symbols mapped from the coded bits, the a priori known symbols are referred to as pilot symbols. The known symbols used in this invention are however not strictly limited to the notation of preamble or pilot symbols. In OFDM, known symbols may be inserted in a subset of OFDM symbols in a subset of the subcarriers for instance.

The receiver of the communication system receives a receive signal that aggregates the various data burst signals sent from the plurality of terminal transmitters over the return link. At the receiver side the waveform is demodulated to obtain the receive values of the various symbols. The receive value of a symbol is not exactly equal to the transmit value, due to channel effects such as the addition of noise and distortion. The receive symbols can therefore be said to be a version of the transmit symbols. The symbols are subsequently demapped. The demapper outputs for example likelihood ratios of the coded bits, which are next fed to the decoder. Like the encoder, the decoder can be composed of one or more concatenated decoders. In some embodiments one or more decoders can process the received information in an iterative manner and one or more decoders can also exchange information with the demapper in an iterative fashion. Both the demapper and the decoder may provide information regarding the quality of the received signal.

In the method of this invention one determines on one or more received versions of data bursts sent from one of the terminal transmitters of the system a metric indicative of the amount of non-linear distortion that results from a power amplifier in that transmitter. The non-linear distortion metric gives an indication of the link quality. Hereinafter the non-linear distortion metric is shortly called distortion metric. In an embodiment this distortion metric is the signal-to-noise-and-distortion ratio measured with a state-of-art noise and distortion level estimator and here referred to as CND (where C denotes the carrier power or useful signal power, N thermal noise power and D distortion power). CND refers to the ratio of the average signal power vs the power of all impairments seen by the decoder. In another embodiment the distortion metric is the carrier-to-distortion ratio, i.e. the ratio of useful signal power to distortion power. There are many link quality estimation algorithms available. These algorithms can be divided in two classes: algorithms using a priori knowledge of the transmitted symbols (so-called known symbols), also known as data-aided (DA) algorithms, and algorithms which do not use known symbols, also known as non-data-aided (NDA) algorithms. Amongst the NDA algorithms, an algorithm is further a decision-directed (DD) algorithm if it uses a detection or a decoding scheme in order to deliver a provisional (or tentative) symbol value that is used as a priori information.

The link quality estimation may be used by an adaptive coding and modulation unit to influence the selection of the current modcod, to increase the availability or the throughput of the communications link. In absence of channel impairments such as channel distortion and noise, the receive signal is equal to the transmit signal. In practice, however, non-linear amplification, more particularly amplification by the HPA at the transmitter, changes the phase and amplitude of the transmit signal and thus generates distortion, as already mentioned above.

Figure 3:
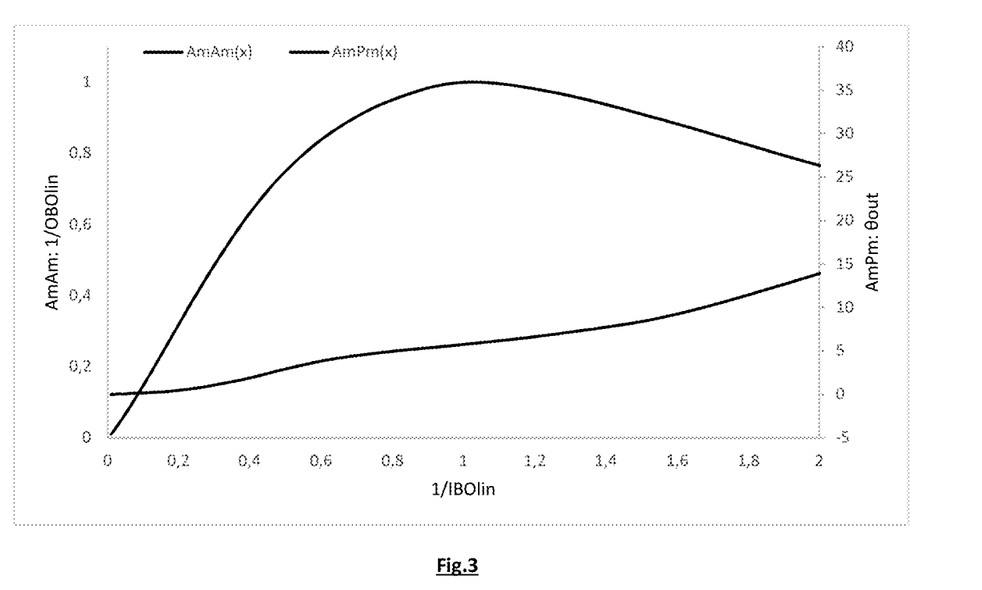
FIG. 3 illustrates an AM/AM curve and an AM/PM curve.

The non-linearities of the HPA can be modelled by an AM/AM and AM/PM curve, where AM and PM refer to the magnitude and phase of a complex signal, respectively. In case of a wideband HPA, the non-linearities might be modelled with multiple curves due to frequency sensitivity of the non-linearities. The AM/AM curve reflects the amplified signal magnitude versus the magnitude of the signal before amplification. The AM/PM curve returns the phase rotation the signal incurred during amplification in the HPA versus the signal magnitude before amplification. The absolute phase of the receive signal at a particular time instance thus equals the transmit signal phase at the corresponding time instance plus the phase rotation applied by the channel. The AM/AM and AM/PM curves are often normalized, such that the saturation point (i.e. the maximum) of the AM/AM curve is (1,1). The ordinate and abscissa of such normalized curves are then the inverses of the output backoff ($OBO_{lin}$) and input backoff ($IBO_{lin}$) of the amplifier, respectively, whereby the subscript lin refers to the fact that the values are shown in linear scale. An example of AM/AM and AM/PM curves is given in FIG. 3. The normalized input amplitudes smaller than 1 are referred to be "before saturation", while the input amplitudes greater than 1 are referred to be beyond or after saturation. The right y-axis shows the phase rotation in degrees.

Figure 4:
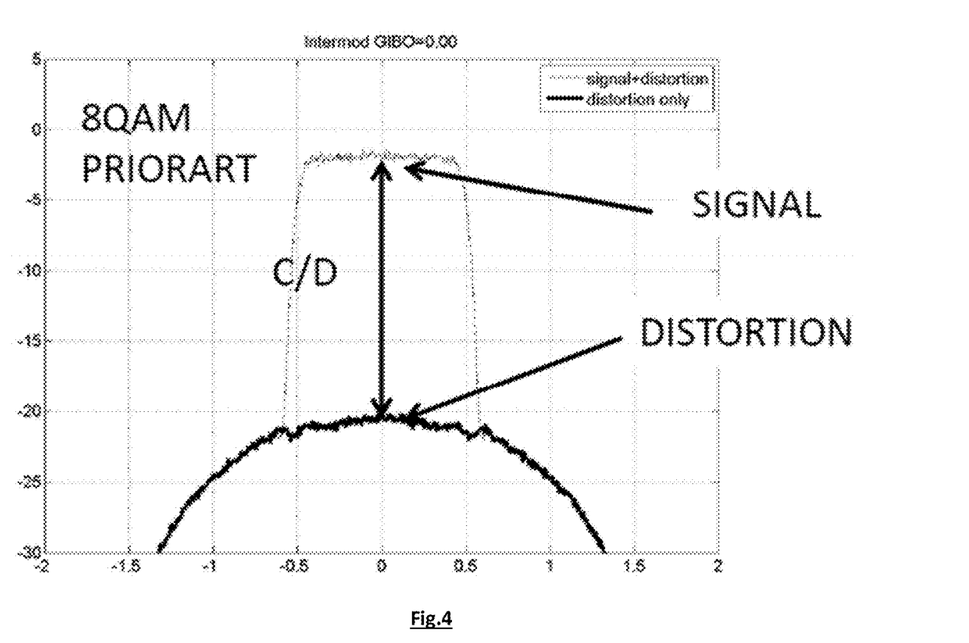
FIG. 4 illustrates a carrier-to-distortion power ratio metric.

The (non-linear) distortion caused by the non-linear part of the amplifier is best illustrated by considering the symbol-level transmission link. The symbol-level transmission link includes the transmit pulse shaping filter (PSF) and the receive matched filter (MF) and is thus the channel seen between the transmit and receive I/Q symbols. The distortion caused by the symbol-level transmission link is illustrated by plotting the location of the received symbols of one source in the absence of channel noise, which is referred to as a scatter plot at the receiver side (in the following, simply called a "scatter plot"). The distortion mainly has two consequences:

(1) In a scatter plot each constellation point becomes a cluster, caused by intersymbol interference (ISI) due to the memory (caused by the filters, such as IMUX, OMUX, but also PSF and MF) in the channel, and (2) constellation warping occurs, which causes the mass points of the clusters to be no longer on the original system constellation grid A distortion metric is calculated on the signal coming in at a receiver. This receive signal is an aggregate of versions of the data burst signals sent from the terminal transmitters of the communication system to which channel impairments are added. More specifically, a distortion metric is determined on one or more channel impaired data burst signals from one of the terminal transmitters. In one of the preferred embodiments this performance measure is the carrier-to-distortion power ratio (CD) calculated directly at the receiver. This computation is not necessarily executed in the receiver itself. In one embodiment this information can also be extracted using machine learning tools external to the receiver, such as neural networks in the cloud. The CD metric is visualized in FIG. 4. FIG. 4 additionally illustrates the spectral shape of distortion generated by the amplification of an 8-QAM constellation modulated with single carrier transmission disclosed in U.S. Pat. No. 7,254,188.

The CD metric can be obtained in multiple ways. In one embodiment the noise power is measured in a silent moment, e.g., in between frames (in MF-TDMA systems like DVB-RCS, a set of bursts from a plurality of terminals is aggregated in frames, and there is typically a small guard time in between frames; in an OFDM grid such as for 5G, N can be measured in unused resource elements for instance), and the power C is measured on the known symbols of a transmission (e.g. a preamble like the SOF in DVB-S2(X), SRS or DMRS symbols in 5G). The data of the transmission provides CND, such that a CD estimation can be extracted as follows: $CD=1/(1/CND-N/C)$. In another embodiment the non-linear distortion can be directly extracted from the known symbols and unknown (i.e. data) symbols using machine learning tools. The paper "*Machine Learning-Based Characterization of SNR in Digital Satellite Communication Links*" (B. Dhuyvetters et al., March 2021, EuCAP 2021) provides an example on how to blindly estimate IBO from raw data using machine learning tools.

In other embodiments the distortion metric is based on the bit error ratio (BER) or the modulation error rate (MER) for a measured carrier-to-noise ratio (CN) value. The MER is defined as the ratio of the root mean square power of the error vector to the power of the reference. The error vector is the difference between the received symbol vector and the corresponding transmitted symbol vector (e.g. obtained after successful decoding). The reference is the predefined constellation used for demapping. When using the bit error ratio, which could be the channel BER measured behind the demapper, a higher transmit power that does not result in a lower bit error ratio may serve as an indication of excessive distortion.

In some embodiments the distortion metric is conveyed to the transmitter for further use in the determination of the updated transmit power values for the next signal that will be transmitted. The distortion metric may come from the receiver that took care of the distortion metric computation or from the cloud. In some embodiments it is not the distortion metric that is conveyed to the transmitter, but rather directly the updated transmit power value itself.

In general, the most advantageous constellations with a higher modulation order have a larger peak-to-average power ratio (PAPR) and require a higher carrier-to-distortion power to allow a smooth demodulation and decoding at the receiver side. For example, consider the 16-APSK constellation illustrated in FIG. 5. In this figure the reference constellation is given by the big black dots 501. Clearly the outer ring with a higher peak power experiences more distortion than the inner ring as the grey received symbols 502 are further away from and less concentrated around the reference constellation 501.

Figure 5:
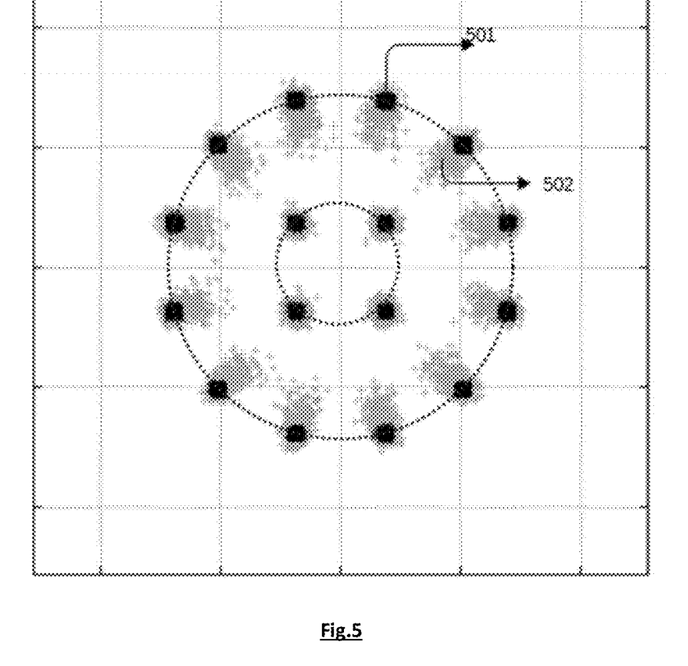
FIG. 5 illustrates a 16-APSK constellation.

The illustrated 16-APSK constellation has a PAPR of 1.1 dB. Combining this constellation with the DVB-S2 FEC (forward error correcting code) with coding rate 2/3, the optimal gain input back-off of single carrier transmission as in DVB-S2(X) over a linear clipped channel taking the frame error rate (FER) as metric is 1.75 dB. The higher the input power is for a given amplifier (in order to reach a desired output power), the closer an amplifier is driven to saturation, i.e., the lower the input back-off (IBO). The lower the input back-off, the more distortion is present in the amplified output signal, so the lower the CD. The illustrated 16-APSK constellation also shows it is hard to estimate the distortion metric for a modulation different from the one currently in use. In preferred embodiments of the invention therefore a known symbol sequence is sent in the same modulation as the payload to correctly measure the distortion experienced by that particular modulation, but the invention is not limited thereto. For instance, in multi-carrier systems such as OFDM, the impact of the modulator order on the PAPR is much lower as the PAPR is mainly determined by the effect of multiple carriers added on top of each other (or by the IFFT in the case of OFDM).

The contribution of the distortion to the CND is negligible when the CD is much higher than the CN. Indeed, considering that $CND=1/(N/C+D/C)$, it can be immediately seen that, for a CD that is 15 dB higher than the CN, the contribution from the CD only subtracts 0.135 dB from the CN to yield the CND. For example, if the CN is 15 dB and the CD is 30 dB, than the CND=14.865 dB, or 0.135 dB lower than the CN. In general, a CD that is much higher than the CN or CND has a negligible effect on the performance.

The above description comprises C (carrier power), N (noise power) and D (distortion power), but the invention is not limited to this. In general, N captures all impairments other than distortion power. If a link is interference limited, then N can be the interference power for instance. If a link is phase noise limited, N mainly comprises phase noise power. In a typical embodiment N comprises mainly thermal noise power, but the invention is not limited to this.

In the method of the present invention one metric is determined that is indicative of the amount of non-linear distortion present in the received data burst signals due to the power amplifier of the terminal transmitter under consideration. That metric may for example be the CD or the CND. A second metric provides an indication of at least one other impairment than the non-linear distortion. The second metric may for example be the CN. As mentioned above, the noise power N may mainly comprise thermal noise power, but may in other cases comprise a dominating contribution due to interference power or phase noise power or another impairment. Note that in case the CD is considered for the first metric, the second metric may also be the CND. The invention is however not limited to the combinations mentioned here by way of example. What matters is that one metric takes into account the non-linear distortion and that the other metric considers at least one other impairment than non-linear distortion. Based on the information provided by the two metrics allows assessing the relative impact of the non-linear distortion and deciding on an update of the uplink transmit power.

Previously, ACM was already introduced, which uses the estimated link quality at the receiver to maintain availability (i.e., a more robust modcod is used in the case of decreasing link quality) or increase the throughput (i.e., a less robust but more efficient modcod). Another important process is denoted by automatic uplink power control (AUPC), which in this invention refers to a process to automatically update the terminal transmit power, based at least on an estimation of the link quality from a received signal. Using another terminology, AUPC is referred to as a power optimization function.

Clearly, in one embodiment the carrier-to-distortion power ratio (CD) introduced above is an important input to this power optimization function. If one metric, in a preferred embodiment the CD, is for example much higher than the other metric being considered, e.g. the CN or CND, then the power optimization function can advise a higher transmit power, which may result in a higher carrier power C and therefore a higher CND at the receiver. As already mentioned above, N typically comprises thermal noise, but N can also comprise interference or phase noise power or other limiting impairments. In a particular embodiment a higher transmit power value can be assigned if the CD exceeds the CN by a margin of 15 dB. The reader skilled in the art recognizes a similar rule can be that the CD must be 15 dB higher than the CND, as the CN and CND are very close for such high CD. Similarly, margins smaller or larger than 15 dB can also apply, given the constraints of a particular use case.

In another embodiment, the MER or BER can be used to adapt the power. If the MER is still acceptable, being above a certain value, one could increase the power of transmitter increasing throughput and modulation. Similarly for the channel BER, if one stops noticing significant improvements on the channel bit error rate when increasing the power (even without packet loss), the power cannot be increased any further. The exact thresholds of these events depend on the modcods in use.

Through ACM, more robust modcods are selected at much lower CND values, e.g. a CND of 0 dB. In that case the CD can be much lower, e.g. around 15 or 18 dB for a CND of 0 dB, which means the transmit amplifier can be driven much closer to saturation, even beyond saturation, in order to reach a high transmit power. More efficient modcods operate at a higher CND, e.g. at a CND of 15 dB. In that case the CD must be much higher, e.g. 30 dB, meaning that the transmit amplifier must back off sufficiently from saturation. In embodiments of the method presented in this invention the computation function that forms an input to adjusting the transmit power, takes the modcod used by a terminal into account.

In a preferred embodiment the distortion metric is computed on known symbols (e.g. on a preamble in single carrier transmission or on SRS or DMRS symbols in the case of 5G OFDM) dedicatedly optimized for accurately estimating said distortion metric. In the case of 5G OFDM, such dedicatedly optimized known symbols may still be called SRS or DMRS symbols or may be called differently. They may comprise more symbols than the regular SRS or DMRS symbols or not. Advantageously, especially in the case of single carrier transmission, said known symbols on which the distortion metric is computed, are in the same modulation order as the data or payload. Indeed, as explained above, the PAPR of a waveform and thus the generated distortion, depends on the modulation order. By using known symbols with the same modulation order as the data, the estimated distortion metric on those known symbols, especially in single carrier transmission, will be relevant for the actual distortion experienced on the payload. Also advantageously, there are sufficient of those known symbols (e.g. a long enough preamble or sufficient SRS or DMRS symbols) to average out the effects of one or more other impairments, such as thermal noise. Not every burst needs to contain sufficient of those known symbols (e.g. such a longer preamble). For example, including sufficient known symbols for at least the purpose of distortion estimation once per second leads to a sufficiently fast update of the distortion metric, while reducing the average return link waveform efficiency only in a negligible way. In the other data burst signals, less known symbols may be included. Depending on the use case (e.g. the amount of data transmitted by the terminal or the experienced CD by that terminal), the optimal frequency of including such a sufficient amount of known symbols for at least distortion estimation can vary.

The transmitter can increase the number of known symbols for distortion estimation periodically, e.g. once per second as already mentioned, or based on an event, e.g. a configuration change, a change in the weather conditions, . . . . At the receiver side one can take advantage of the longer known symbol sequence to determine the distortion metric.

More accurately than looking at the "present distortion metric", such as the present CD, one can actually predict which future CD will be observed given the newly assigned power calculated for a terminal.

To predict a future distortion metric, after updating the transmit power, a model of the HPA of a terminal can be assumed. In one embodiment, this model is the AMAM/AMPM model or multiple AMAM/AMPM models as discussed before. In another embodiment this can be a derived version of the AMAM/AMPM model such as the IBO to OBO characteristics. In yet another embodiment this model can even be an idealized power amplifier where only the saturation point is known and the remainder is derived from this point. In an embodiment wherein such a model is used, the transmit power is calculated at least partially based on a selected modcod and on channel conditions and then translated into predicted CD metrics and predicted CN metrics.

In networks with multiple terminals, however, it may be required to use a set of multiple HPA reference models to adequately represent each individual HPA in the network. From this set the most appropriate model for a terminal can be learned terminal per terminal based on the received metrics and the available HPA reference models, e.g., using a multi-armed bandit approach where an HPA model is selected at random with a probability distribution that depends on the difference between the predicted distortion and the measured distortion of previous selections. In yet another embodiment the actual HPA model can even be learned directly from the observed metrics.

The HPA characteristics typically depend on many variables including temperature and frequency. These variables may change over time and therefore cause an incorrect CD prediction. To avoid excessive errors in the prediction, in one embodiment only small transmit power variations can be considered. The smaller steps limit the prediction error as the mismatch can be taken into consideration in the next iteration.

The predicted CD is a more accurate metric than the current distortion metric as both the updated modcod and the updated transmit power are taken into account. The predicted CD can therefore reduce the margins needed on the CD as well. In one embodiment the predicted CD can be as low as the predicted CN+12 dB. The predicted CN can incorporate the compression that occurs as a consequence of the non-linearity of the HPA, which originates from the AM/AM model of the HPA.

Using modcods with low decoding thresholds with corresponding low predicted CN values makes it possible to have low predicted CD values according to the method disclosed above, especially for single ring constellations such as QPSK and 8-PSK. However, for such low CD values, other effects may start playing a role, like influencing adjacent (sub-)carriers transmitted by other terminals (as the spectral regrowth from the distortion gets higher in power spectral density). In the case of single carrier transmission per terminal, wide carriers with a corresponding higher power can then easily disturb small adjacent carriers, which can fall entirely in the generated distortion of the adjacent signal. In the case of OFDM transmission, terminals transmitting many sub-carriers can then easily disturb terminals transmitting few sub-carriers adjacent in frequency. Therefore, it is preferred to lower bound the allowed predicted CD of these modulation schemes. In one embodiment this could be down to 18 dB.

Due to the sensitivity in single carrier transmission of multi-ring constellations such as 16-APSK to distortion, as illustrated above, one embodiment puts an additional lower bound on the allowed predicted CD value. This limitation puts an upper bound on the total observed distortion and this prevents multi-ring constellations from deteriorating beyond recoverable. 8-PSK constellations with efficient codes (i.e., high coding rates) have higher thresholds than the 16-APSK with strong codes (i.e., low coding rates), yet these 16-APSK constellations are more sensitive to distortion than the 8-PSK constellations. In one embodiment, this lower bound on the predicted CD for 16-APSK is put to 21 dB. In one embodiment this may lead to the following equation:

Allowed predicted CD=min(21 dB, predicted CN+12 dB)

Figure 6:
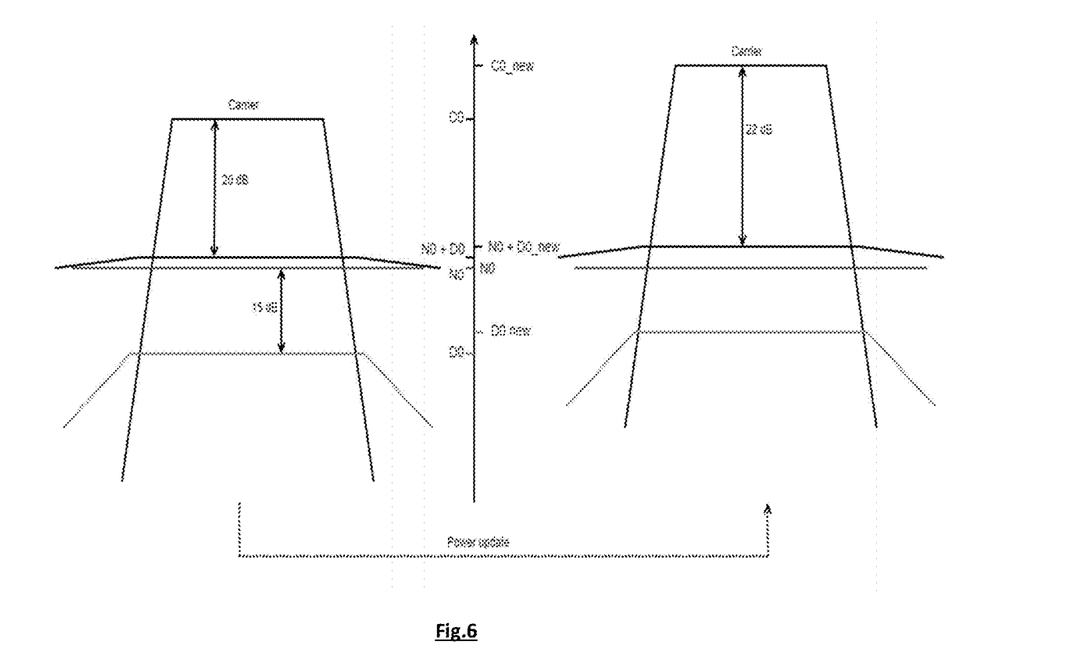
FIG. 6 illustrates a possible updating of the transmit power value based on the determined first and second metric.
Figure 7:
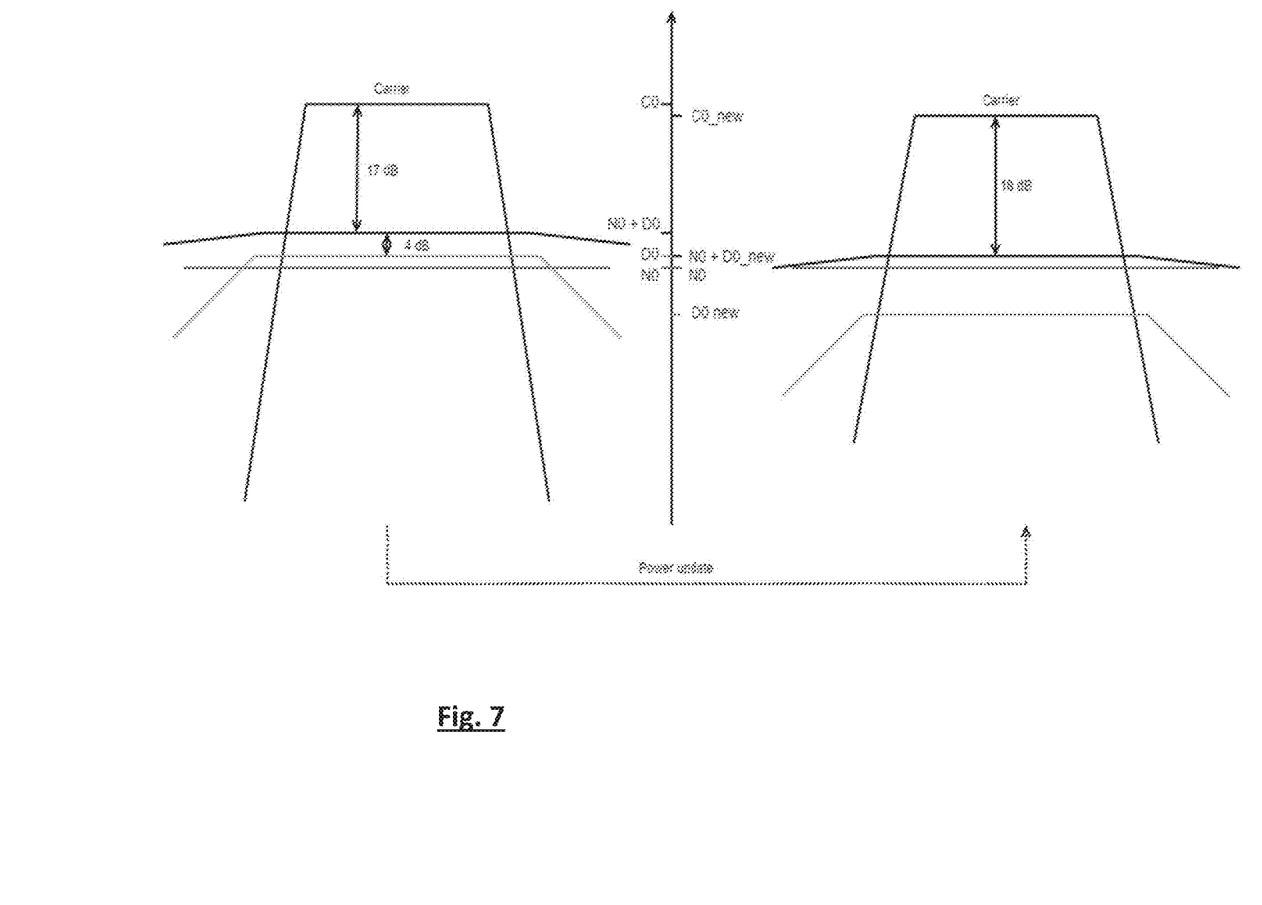
FIG. 7 illustrates another example of an updated transmit power value based on the determined first and second metric.
Figure 8:
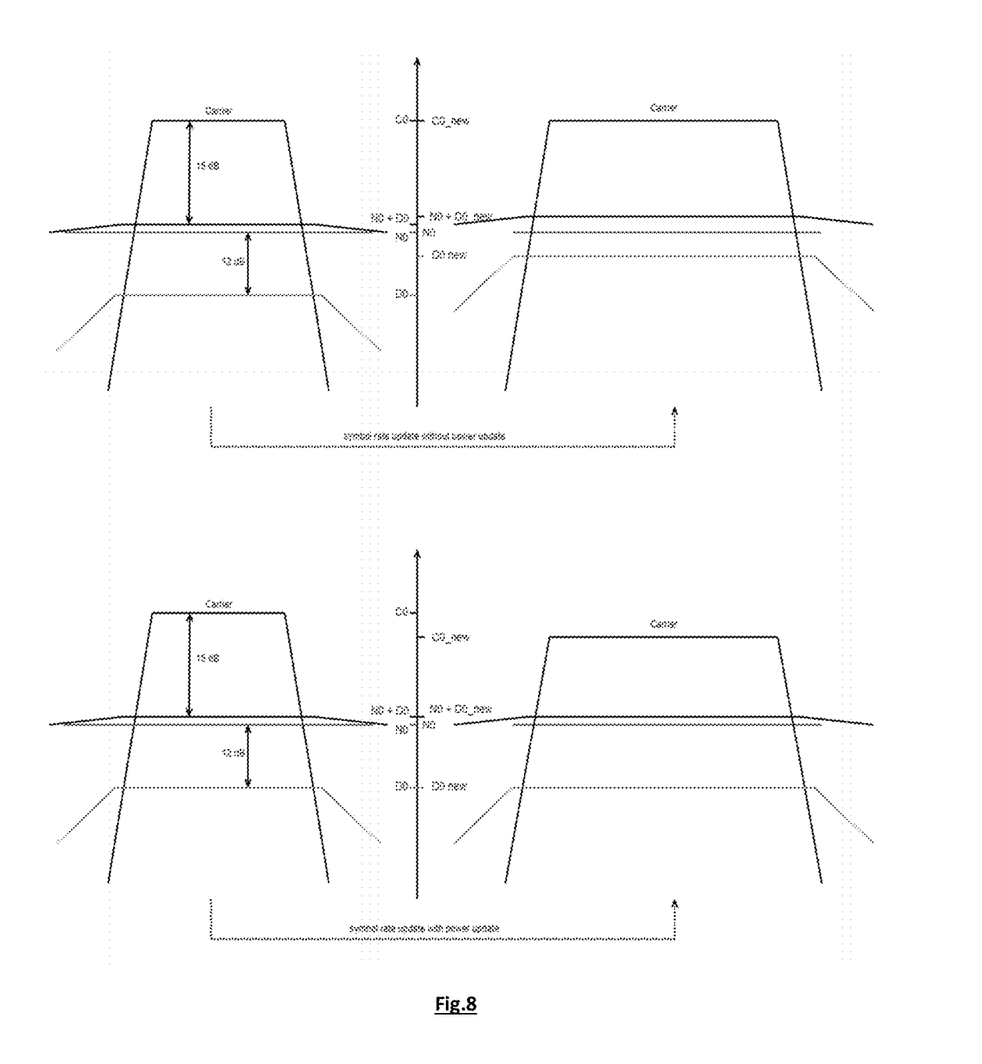
FIG. 8 illustrates an example, where a symbol rate update may lead to an update of the transmit power based on the determined first and second metric.

In the last step of the method of the invention an updated transmit power value is derived for the next data burst signal that is to be sent from the terminal transmitter being considered. The updated value is determined based on the first and second metric obtained in preceding steps of the method. FIGS. 6 to 8 show some examples of how the updating can be performed. The left hand part of each figure shows the current situation and the right hand side the situation after the power update. C0 and C0_new refer to the power spectral densities of the carrier before and after the power update, respectively. The carrier power C is then the integration of C0 over the signal bandwidth (i.e., C0* symbol rate for a flat power spectral density and a square root raised cosine pulse shaping filter). N0 refers to the power spectral density of the noise (to be extended with other impairments if relevant). The noise power N is the integration of N0 of the useful carrier signal bandwidth. D0 and D0_new refer to the power spectral densities of the distortion before and after the power update, respectively. The distortion power, within the user signal bandwidth, D, is then the integration of D0 over the useful carrier signal bandwidth.

The left hand part of FIG. 6 illustrates a situation one can encounter in various embodiments of the proposed method. In one embodiment the first metric may be the CD and the second metric the CN. The condition for performing a power increase is that the CD must be greater than the CND+12 dB. As can be seen from the figure, this condition is met. In another embodiment the first metric is the CD and the second metric is the CND and the condition for a power increase is that CD>CND+12 dB (which is fulfilled). The situation depicted in FIG. 6 may also result from an embodiment wherein the first metric is CND and the second metric is CN and the condition for a power increase is that CND is about the same as CN or (CN−CND)<1 dB (which is fulfilled). The right hand side part of FIG. 6 shows the effect of a power update, whereby the carrier power is increased. Also the distortion power has increased but that only has a minor effect on the aggregate power of distortion and noise, given the considerable difference in level between the noise power and distortion power. Under the above conditions, one can be sure the CND after the power update is larger than before the power update and that the increased distortion power spectral density is still sufficiently below the noise power spectral density in order not to disturb adjacent carriers. This is illustrated on the right hand side of FIG. 6, where the CND is 22 dB after the power update where it was 20 dB before the power update and where the distortion power spectral density after the power update is still well below the noise power spectral density.

In a second example the situation at hand is the one depicted in FIG. 7. In this somewhat extreme case the CD is even smaller than the CN. Such situation may occur when e.g. a cable has been replaced at the terminal's site resulting in an oversaturation of the terminal amplifier. The same embodiments are considered as for FIG. 6. That is, in a first embodiment the first metric is the CD and the second metric the CN, while for a power increase the condition is that CD must be greater than CN+12 dB. This is clearly not the case in FIG. 7. Hence, the terminal output power needs to be reduced. In the second embodiment the first metric is CD and the second metric CND and the condition for a power increase is that CD>CND+12 dB. This is clearly not the case here, as the CD is only 4 dB higher than the CND. In the third embodiment CND is used as first metric and CN as second metric and the condition for a power increase is that CND is about the same as CN or (CN−CND)<1 dB, which is not fulfilled here. As already said, a reduction of the uplink transmit power level is needed now. As can be seen on the right hand side of FIG. 7, after this power update, i.e. after the transmit power reduction, the distortion power has decreased significantly, which decreases the aggregate power of distortion and noise in a meaningful way. The carrier power has also decreased, but less than the distortion power and also less than the decrease of the aggregate power of distortion and noise. As a consequence, the overall CND increases from 17 to 18 dB due to the power decrease. In addition, adjacent carriers will receive less interference from the spectral regrowth after the power update.

In the next example the situation shown on the left-hand side at the top of FIG. 8 is assumed. The CND equals 15 dB. The carrier-to-noise ratio CN is 12 dB smaller than the carrier-to-distortion ratio CD and, hence, the CND is only slightly smaller than the CN. The impact of a symbol rate update is now investigated. In top part of FIG. 8 the symbol rate is increased while the power spectral density is maintained to keep the signal-to-noise ratio (SNR) unchanged. This obviously increases the total power transmitted by the terminal amplifier and therefore also the distortion due to the increased saturation level of the terminal amplifier. Then there are two options. Either this increased distortion is detected after the symbol rate update and is then addressed by a power update afterwards, according to the invention. Alternatively, the increased power and distortion is predicted as described above and so avoided by combining the symbol rate update with a power update, as illustrated in bottom part of FIG. 8.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for adjusting transmit power of a terminal transmitter of a communication system on a return link between said terminal transmitter and a receiver of said communication system, said terminal transmitter being one of a plurality of terminal transmitters of said communication system,
wherein each terminal transmitter is configured to send one or more data burst signals, said receiver receiving a receive signal being an aggregate of versions of said one or more data burst signals sent from said plurality of terminal transmitters, the method comprising:
a) determining on a version of at least one data burst signal comprised in said receive signal, said at least one data burst signal sent from a first terminal transmitter of said plurality, a first metric indicative of the amount of non-linear distortion with which said version of said at least one data burst signal is impaired, said non-linear distortion resulting from a power amplifier in said first terminal transmitter,
b) determining on at least a part of said receive signal a second metric indicative of at least one impairment other than said amount of non-linear distortion,
c) determining an updated transmit power value for a next data burst signal to be sent from said first terminal transmitter, depending on whether or not a preset condition expressing a relation between said first metric and said second metric is met, thereby assessing the relative impact of said first metric indicative of the amount of non-linear distortion.

2. The method for adjusting transmit power as in claim 1, wherein at least said first metric indicative of the amount of non-linear distortion is determined on a plurality of known symbols comprised in said version of said at least one data burst signal comprised in said receive signal.

3. The method for adjusting transmit power as in claim 2, wherein said plurality of known symbols is part of a preamble of said at least one data burst signal.

4. The method for adjusting transmit power as in claim 2, wherein said plurality of known symbols is part of the DMRS symbols or SRS symbols of said at least one data burst signal.

5. The method for adjusting transmit power as in claim 2, wherein said known symbols have a same modulation order as payload data comprised in said at least one data burst signal.

6. The method for adjusting transmit power as in claim 1, wherein said at least one data burst signal sent from said first terminal transmitter is modulated using single carrier transmission.

7. The method for adjusting transmit power as in claim 1, wherein said at least one data burst signal sent from said first terminal transmitter is modulated using OFDM.

8. The method for adjusting transmit power as in claim 7, wherein said at least one data burst signal sent from said first terminal transmitter is modulated according to the 5G-NR standard.

9. The method for adjusting transmit power as in claim 1, wherein said receiver determines said first metric periodically or event-based, while the transmitter has increased the number of known symbols of said frame.

10. The method for adjusting transmit power as in claim 1, comprising a step of predicting an updated value of said first metric when said updated transmit power value is determined.

11. The method for adjusting transmit power as in claim 10, wherein for said predicting a model is used of said power amplifier of said first terminal transmitter.

12. The method for adjusting transmit power as in claim 11, wherein said model is derived from observed distortion metrics.

13. The method for adjusting transmit power as in claim 1, wherein said first metric is indicative of a carrier-to-distortion power ratio.

14. The method for adjusting transmit power as in claim 1, wherein the power of said non-linear distortion is measured by means of a detector assuming a predetermined amplifier non-linear characteristic.

15. The method for adjusting transmit power as in claim 1, wherein in step c) a higher transmit power value is selected for said next data burst signal if said second metric differs from said first metric with a predetermined amount.

16. The method for adjusting transmit power as in claim 13, wherein in step c) a higher transmit power value is selected for said next data burst signal if said carrier-to-distortion ratio exceeds a carrier-to-noise ratio with a predetermined amount.

17. The method for adjusting transmit power as in claim 1, wherein said transmit power is an uplink transmit power of a terminal in a satellite communication network.

18. The method for adjusting transmit power as in claim 1, wherein said second metric is indicative of thermal noise.

19. The method for adjusting transmit power as in claim 1, wherein at least steps a) and c) are performed for at least one other terminal transmitter of said plurality.

20. The method for adjusting transmit power as in claim 1, wherein a controller is arranged for determining said updated transmit power value and for providing said updated transmit power value to said terminal transmitter.

* * * * *